US012707410B2

(12) United States Patent
Sun et al.

(10) Patent No.: US 12,707,410 B2
(45) Date of Patent: Aug. 11, 2026

(54) SUPPORTING TWO TIMING ADVANCES IN A SERVING CELL OF A WIRELESS SYSTEM

(71) Applicant: Apple Inc., Cupertino, CA (US)

(72) Inventors: Haitong Sun, Cupertino, CA (US); Xiang Chen, Campbell, CA (US); Wei Zeng, Saratoga, CA (US); Hong He, San Jose, CA (US); Ankit Bhamri, Bad Nauheim (DE); Dawei Zhang, Saratoga, CA (US); Huaning Niu, San Jose, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 18/394,212

(22) Filed: Dec. 22, 2023

(65) Prior Publication Data

US 2024/0251369 A1 Jul. 25, 2024

Related U.S. Application Data

(60) Provisional application No. 63/439,943, filed on Jan. 19, 2023.

(51) Int. Cl.
*H04W 74/04* (2009.01)
*H04W 56/00* (2009.01)
*H04W 74/0836* (2024.01)

(52) U.S. Cl.
CPC ... *H04W 56/0045* (2013.01); *H04W 56/0015* (2013.01); *H04W 74/04* (2013.01); *H04W 74/0836* (2024.01)

(58) Field of Classification Search
CPC ......... H04W 56/0045; H04W 74/0836; H04W 56/0015; H04W 74/04
See application file for complete search history.

(56) References Cited

U.S. PATENT DOCUMENTS

2012/0300752 A1* 11/2012 Kwon ................. H04W 56/001 370/336
2016/0057752 A1* 2/2016 Ahn .................. H04W 72/0446 370/329

(Continued)

FOREIGN PATENT DOCUMENTS

WO WO 2021/243675 A1 12/2021

OTHER PUBLICATIONS

NTT Docomo, Inc., "Discussion on two TAs for multi-DCI", 3 GPP TSG RAN WG1 #110, R1-2207394, Toulouse, France, Aug. 22-26, 2022; 5 pages.

(Continued)

*Primary Examiner* — Abdelnabi O Musa
(74) *Attorney, Agent, or Firm* — Sterne, Kessler, Goldstein & Fox P.L.L.C.

(57) ABSTRACT

Some aspects relate to apparatuses and methods for a wireless system supporting two timing advances in a serving cell for a user equipment (UE) communicating with two different transmission reception points (TRPs). The UE can determine that a first timing advance (TA) group (TAG) and a second TAG are configured for a serving cell based on a configuration received from the base station; and further determine a first TA adjustment value based on a first timing advance command (TAC) and a second TA adjustment value based on a second TAC. The UE can select a TAC from the first TAC or the second TAC to be applied to an uplink transmission. The UE can further select, based the selected TAC, a TAG from the first TAG or the second TAG; and transmit the uplink transmission according to the selected TAC with the selected TAG.

17 Claims, 5 Drawing Sheets

(56) References Cited

U.S. PATENT DOCUMENTS

| | | | | |
|---|---|---|---|---|
| 2018/0131431 | A1* | 5/2018 | Dinan | H04L 1/1825 |
| 2020/0015184 | A1* | 1/2020 | Yang | H04W 56/0055 |
| 2023/0354229 | A1* | 11/2023 | Prasad | H04W 56/0015 |
| 2024/0357529 | A1* | 10/2024 | Nilsson | H04W 56/0045 |
| 2024/0430837 | A1* | 12/2024 | Sun | H04W 28/10 |
| 2025/0048300 | A1* | 2/2025 | Prasad | H04W 76/20 |

OTHER PUBLICATIONS

Sharp, "Two TAs for multi-DCI", 3 GPP TSG RAN WG1 #110, R1-2207451, Toulouse, France, Aug. 22-26, 2022; 7 pages.

International Search Report and Written Opinion of the International Searching Authority, directed to related International Patent Application No. PCT/US2024/012031, mailed Jun. 6, 2024, 22 pages.

* cited by examiner

SUPPORTING TWO TIMING ADVANCES IN A SERVING CELL OF A WIRELESS SYSTEM

RELATED APPLICATIONS

This application claims benefit of U.S. Provisional Patent Application No. 63/439,943 filed Jan. 19, 2023, the content of which is herein incorporated by references in its entirety.

BACKGROUND

Field

The described aspects generally relate to wireless communication, including supporting two timing advances for a user equipment (UE) in a serving cell of a wireless system.

Related Art

A wireless communication system can include a fifth generation (5G) system, a New Radio (NR) system, a long term evolution (LTE) system, a non-terrestrial wireless network (NTN), a combination thereof, or some other wireless systems. In addition, a wireless communication system can support a wide range of use cases such as enhanced mobile broad band (eMBB), massive machine type communications (mMTC), ultra-reliable and low-latency communications (URLLC), enhanced vehicle to anything communications (eV2X), among others. A wireless system may include multiple transmission reception points (TRPs) in communication with a user equipment (UE). Coordination of the multiple TRPs may be desired.

SUMMARY

Some aspects of this disclosure relate to apparatuses and methods for implementing mechanisms to support two timing advances in a serving cell of a wireless system so that a user equipment (UE) communicating with two different transmission reception points (TRPs) can be better coordinated. Techniques presented herein can be applicable when a timing synchronization error between two TRPs is large, or the distance between different panels or different TRPs is large, e.g., larger than a cyclic prefix (CP).

Some aspects of this disclosure relate to a UE. The UE can include a transceiver, and a processor communicatively coupled to the transceiver. The transceiver can be configured to enable wireless communication with a base station in a wireless system. The processor of the UE can determine that a first timing advance (TA) group (TAG) and a second TAG are configured for a serving cell based on a configuration received from the base station. In some embodiments, a first time alignment timer for the first TAG is different from a second time alignment timer for the second TAG. The processor can further determine a first TA adjustment value based on a first timing advance command (TAC) and a second TA adjustment value based on a second TAC.

In addition, the processor can select a TAC from the first TAC or the second TAC to be applied to an uplink transmission. In some embodiments, the selected TAC is the first TAC when the UE communicates with a first transmission reception point (TRP) of the wireless system, and the selected TAC is the second TAC when the UE communicates with a second TRP of the wireless system. The processor can further select, based the selected TAC, a TAG from the first TAG or the second TAG; and transmit the uplink transmission according to the selected TAC with the selected TAG.

In some embodiments, the first TAC and the second TAC are received from the base station in a random access response (RAR) message during a Random Access Channel (RACH) procedure by the UE to the base station. The RAR message includes an indication to indicate the selected TAG for the selected TAC for the uplink transmission scheduled by the RAR message. The first TAC is applied to the first TAG that is associated with a Physical Random Access Channel (PRACH) transmission, and the second TAC is applied to the second TAG that is not associated with the PRACH transmission. The first TAC and the second TAC can have different lengths resulting from differential encoding being applied to the first TAC and the second TAC. The RAR message can be a message B of a 2 step Random Access Channel (RACH) process or a message 2 of a 4-step RACH process.

In some embodiments, an indication of the first TAC and the second TAC can be received from the base station in a medium access control-control elements (MAC-CE) transmitted to the UE when the UE is in a connection mode to the base station. The first TAC or the second TAC can be an absolute TAC carrying an absolute TA adjustment value or a relative TAC carrying a relative TA adjustment value. The MAC-CE further can include a TAG identifier corresponding to the first TAC or the second TAC.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
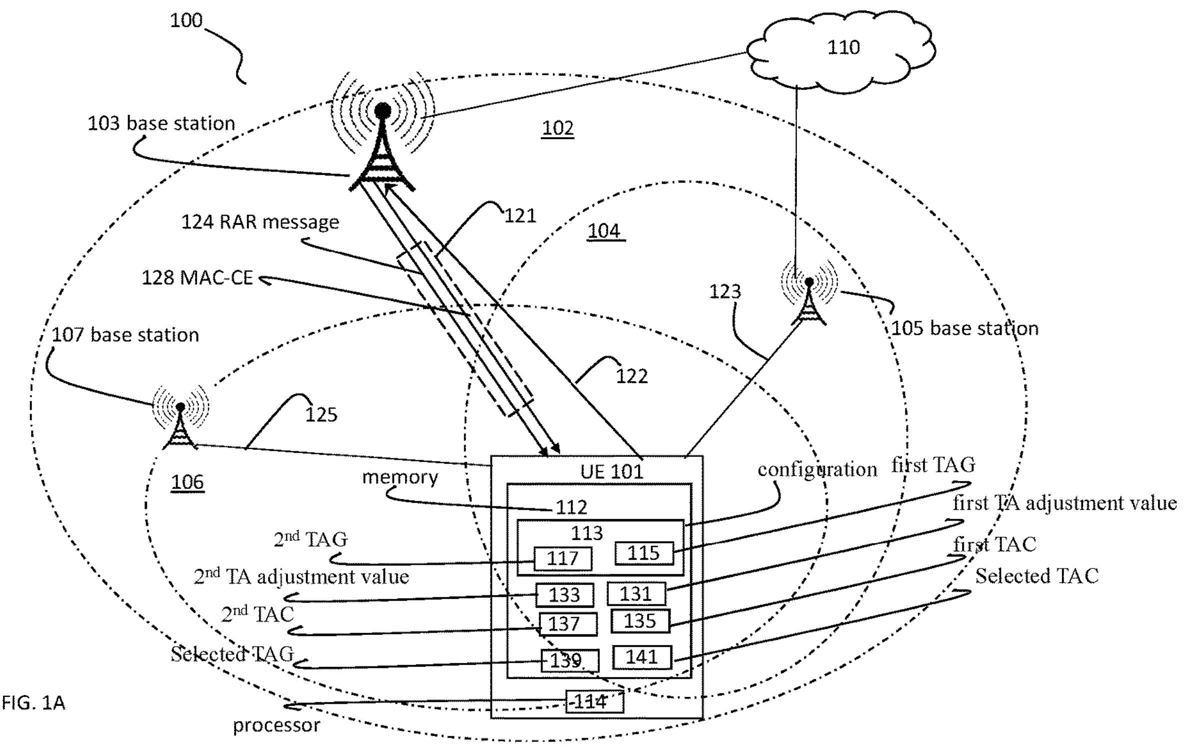
FIGS. 1A-1C illustrate a wireless system to support two timing advances in a serving cell for a user equipment (UE) communicating with two transmission reception points (TRPs), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, a user equipment (UE) can transmit and receive data on one or multiple component carriers (CC)

using coordinated multi-point (COMP) transmission. In traditional cellular networks, a UE is only connected to a single transmission reception point (TRP) of the network at a time and each TRP makes independent scheduling, precoding, and resource allocation decisions. For COMP, multiple TRPs cooperate and coordinate their transmissions such that a UE can receive transmissions from multiple TRPs simultaneously to increase the throughput of the UE.

In some wireless systems, it may be assumed that various uplink (UL) and downlink (DL) transmissions from different TRPs, e.g., physical downlink shared channel (PDSCH), physical downlink control channel (PDCCH), physical uplink control channel (PUCCH), and physical uplink shared channel (PUSCH), may be synchronized at the UE receiver so that the maximum receive timing difference (MRTD) is less than a cyclic prefix (CP). However, in practice, it is possible that the MRTD between different TRPs can be more than the CP from the UE receiver point of view. In some wireless systems, the timing synchronization error between two TRPs can be larger than the CP, or the distance between different panels or different TRPs can be larger than the CP.

In some wireless systems, timing advance (TA) is used to control the uplink transmission timing of an individual UE. TA can be a command (notification) from a base station to the UE that enables the UE to adjust its uplink transmission timing. A TA can help to ensure that uplink transmissions from all UE are synchronized when received by the base station. A timing advance group (TAG) can include one or more serving cells with the same uplink TA and same downlink timing reference cell. Each TAG contains at least one serving cell with configured uplink, and the mapping of each serving cell to a TAG can be configured by Radio Resource Control (RRC) messages.

Embodiments herein present mechanisms to support two TAs in a serving cell of a wireless system so that a UE communicating with two different TRPs can be better coordinated. The two TAs can indicate two different UL time adjustments applied respectively to PUSCH, PUCCH and sounding reference signals (SRS) transmitted by the UE. In some embodiments, a first TA can be used for communication with a first TRP for PUSCH, PUCCH or SRS, and a second TA can be used for communication with a second TRP for PUSCH, PUCCH or SRS.

Embodiments herein can support two TAs, and two TAGs for the same serving cell. A UE can determine that a first TAG and a second TAG are configured for a serving cell based on a configuration received from the base station, and further determine a first TA adjustment value based on a first timing advance command (TAC) and a second TA adjustment value based on a second TAC. In addition, the UE can select a TAC from the first TAC or the second TAC to be applied to an uplink transmission; further select, based the selected TAC, a TAG from the first TAG or the second TAG; and transmit the uplink transmission according to the selected TAC with the selected TAG.

In some embodiments, the first TAC and the second TAC can be received from the base station in a random access response (RAR) message during a Random Access Channel (RACH) procedure by the UE to the base station. In some embodiments, an indication of the first TAC and the second TAC can be received from the base station in a medium access control-control elements (MAC-CE) transmitted to the UE when the UE is in a connection mode to the base station.

Figures 1B, 1C:
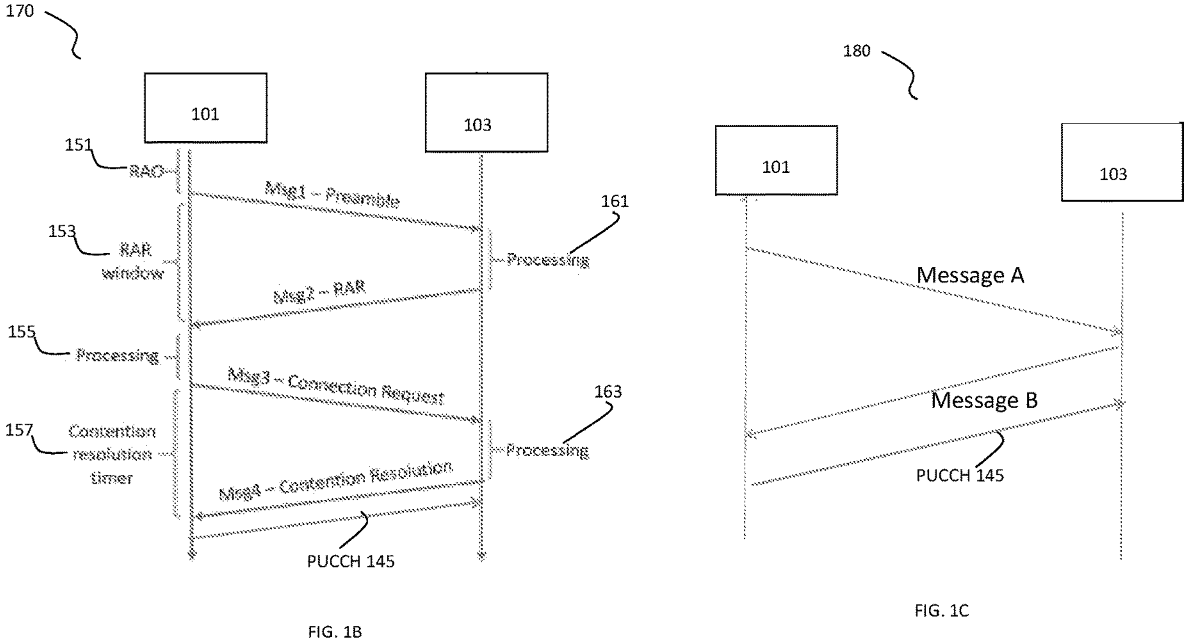

FIGS. 1A-1C illustrate a wireless system 100 to support two TAs in a serving cell for a UE communicating with two TRPs, according to some aspects of the disclosure. Wireless system 100 is provided for the purpose of illustration only and does not limit the disclosed aspects. Wireless system 100 can include, but is not limited to, UE 101, a base station 103, a base station 105, and a base station 107, all communicatively coupled to a core network 110. UE 101 communicates with base station 103 over a communication link 121, communicates with base station 105 over a communication link 123, and communicates with base station 107 over a communication link 125. A base station may be a TRP. For example, base station 105, or base station 107 can be a TRP.

In some examples, wireless system 100 can include one or more of a NR system, a LTE system, a 5G system, or some other wireless system. There can be other network entities, e.g., network controller, a relay station, not shown. Wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103, base station 105, and base station 107 can be a fixed station or a mobile station. Base station 103, base station 105, and base station 107 can also be called other names, such as a base transceiver system (BTS), an access point (AP), a TRP, an evolved NodeB (eNB), a next generation node B (gNB), a 5G node B (NB), or some other equivalent terminology. In some examples, base station 103 can be a gNB, while base station 105 and base station 107 can be a gNB, an eNB, or TRP. In some examples, base station 103, base station 105, and base station 107 can be interconnected to one another and/or to other base station or network nodes in a network through various types of backhaul interfaces such as a direct physical connection, a virtual network, and/or the like, not shown.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103, base station 105, and base station 107 can be communicatively coupled to core network 110. Base station 103 can serve a cell 102, base station 105 can serve a cell 104 contained within cell 102, and base station 107 can serve a cell 106 contained within cell 102 that overlaps with cell 104. In some other embodiments, cell 102 can overlap partially with cell 104 or cell 106. Cell 102, cell 104, and cell 106 can be a macro cell, a pico cell, a femto cell, and/or another type of cell. In comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 and cell 106 can be a pico cell or a femto cell. In addition, cell 102 can be a pico cell while cell 104 and cell 106 can be a femto cell. In some examples, the geographic area of a cell can move according to the location of a mobile base station.

According to some aspects, base station 103 can be the serving base station, a primary node (PN), and cell 102 can be the serving cell or primary cell (PCell). Base station 105 and base station 107 can be neighbor base station to UE 101 that can be a secondary node (SN). Cell 104 and cell 106 can be a secondary cell (SCell), or a primary secondary cell (PScell). There can be other secondary cells for UE 101, not shown. Data for UE 101 can be simultaneously transferred between UE 101 and core network 110 by one or more component carriers between UE 101 and base station 103 at communication link 121, one or more component carriers between UE 101 and base station 105 at communication link 123, and one or more component carriers between UE 101 and base station 107 at communication link 125. UE 101 can communicate with the serving base station, e.g., base station 103, using a first frequency band, and communicate with a neighbor base station, e.g., base station 105 or base station 107 using a second frequency band different from the first frequency band. In some embodiments, cell 102, which is the PCell, may be referred to as the anchor cell that provides a radio resource control (RRC) connection to the UE 101. In some examples, the PCell (cell 102) and the SCell, e.g., cell 104, may be co-located (e.g., different TRPs at the same location).

In some embodiments, one or more of the SCells, such as cell 104 or cell 106, may be activated or added to cell 102, which is the PCell, to form the serving cells serving the UE 101. Each serving cell corresponds to one or more CCs. The CC of the PCell, e.g., cell 102, may be referred to as a primary CC (PCC), and the CC of a SCell, e.g., cell 104 or cell 106, may be referred to as a secondary CC (SCC). The PCell (cell 102) and one or more of the SCells (cell 104 or cell 106) may be served by a respective base station 103, 105, and 107. The coverages of the PCell and SCell may differ since component carriers in different frequency bands may experience different path loss. In some embodiments, the PCell (cell 102) may add or remove one or more of the SCells (cell 104 or cell 106) to improve reliability of the connection to the UE 101 and/or increase the data rate.

In some embodiments, UE 101 may be served by a base station 103, which can be the PN, and one or more secondary nodes, e.g., base station 105 and/or base station 107. A master cell group (MCG) is associated with the base station 103 in the PCell and one or more SCells (cell 104 and/or cell 106). A secondary cell group (SCG) may be associated with the SCells. Different examples may include a different number of SCells. The PN (base station 103) may select the first SCG or the second SCG, and further select one of the SCells to be the PSCell for the SCG.

Figure 2:
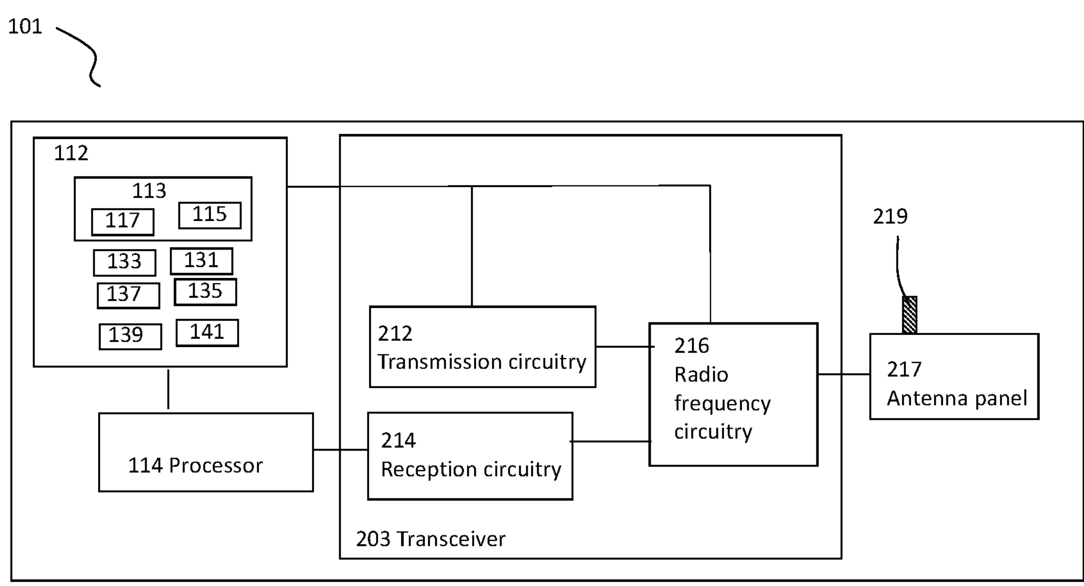
FIG. 2 illustrates a block diagram of a UE to perform functions described herein, according to some aspects of the disclosure.

According to some aspects, UE 101 can include a memory 112, and a processor 114 communicatively coupled to the memory, and a transceiver, as shown in FIG. 2. Memory 112 can be configured to store various data and operations described below.

In some embodiments, processor 114 can be configured to determine that a first TAG 115 and a second TAG 117 are configured for a serving cell based on a configuration 113 received from base station 103. In some embodiments, a first time alignment timer for the first TAG 115 can be different from a second time alignment timer for the second TAG 117. Processor 114 can further determine a first TA adjustment value 131 based on a first TAC 135 and a second TA adjustment value 133 based on a second TAC 137. Processor 114 can select or determine a selected TAC 141 from the first TAC or the second TAC to be applied to an uplink transmission 122. In some embodiments, the selected TAC 141 can be the first TAC 135 when UE 101 communicates with a first TRP, e.g., base station 105, and the selected TAC 141 can be the second TAC 137 when UE 101 communicates with a second TRP, e.g., base station 107. Processor 114 can further select or determine, based the selected TAC 141, a selected TAG 139 from the first TAG 115 or the second TAG 117; and transmit the uplink transmission 122 according to the selected TAC 141 with the selected TAG 139.

In some embodiments, more details of example uplink transmission 122 can be shown in process 170 shown in FIG. 1B or process 180 shown in FIG. 1C. In some embodiments, uplink transmission 122 can be a PUCCH transmission 145. Process 170 or process 180 can be referred to as random access (RA) procedures or RACH procedures as well. System 100 can support two types of RA procedures, contention-based and contention-free. FIG. 1B shows a contention-based RA having 4-step message exchange process 170 between UE 101 and BS 103, while FIG. 1C shows a contention-free mechanism using only a 2-step message exchange process 180.

In some embodiments, as shown in FIG. 1B, at a time window 151, UE 101 can allocate a RA opportunity (RAO), which can be derived by the configuration index. When there is a RAO, UE 101 can send a random access preamble in message 1 to base station 103, by using a physical random access channel (PRACH). At time window 161, base station 103 can estimate the round-trip time (RTT) for UE 101 based on the time of arrival (ToA) of the received preamble in Message 1. Base station 103 can utilize the ToA estimate for determining a timing advance (TA) to be applied by UE 101. Accordingly, UE 101 can transmit a dedicated preamble for the UE to the base station in a 4-step random access channel (RACH) procedure or a 2-step RACH procedure.

Base station 103 can continuously check for preamble reception at a RAO and in case it detects one, base station 103 can respond with a random access response (RAR) known as message 2. The RAR contains the TA parameter, as well as the scheduling information pointing to the radio resources that UE 101 has to utilize for subsequent uplink data transmission and the modulation and coding scheme (MCS). UE 101 receives message 2 during a time window 153, and further processes message 2 at time window 155.

UE 101 can transmit message 3 to initiate a connection request where UE 101 is introduced in the network with a unique ID. This phase is also known as the contention resolution phase during time window 163. Afterwards, base station 103 can send back to UE 101 physical downlink shared channel (PDSCH) message 4 including the confirmation regarding the selected temporary identification, which will act as a permanent ID for the user for all the future message exchanges. Similar to message 2 reception, also in this case UE 101 will wait for message 4 during time window 157 until the contention resolution timer is valid. If this timer expires, UE 101 can re-attempt the RA procedure again at another RAO. Hybrid automatic repeat request (HARQ) protocol is adopted for messages 3 and 4 transmission, where PUCCH transmission 145 including HARQ is transmitted from UE 101 to base station 103. HARQ can include an extra message indicating the reception or not (ACK or NACK) of a certain packet. In case of NACK, the same packet has to be retransmitted.

In some embodiments, in case of a contention-free RA procedure as shown in FIG. 1C, message 3 and message 4 transmissions of FIG. 1B are skipped because in such situations the user is already uniquely identified. Accordingly, as shown in FIG. 1C, message A and PDSCH message B are transmitted between UE 101 and base station 103, which are similar to Message 1 and Message 2 of FIG. 1B.

In some embodiments, the first TAC 135 and the second TAC 137 are received from base station 103 in a RAR message 124, which is message 2 of process 170, during a RACH procedure by UE 101 to base station 103. The RAR message can include an indication to indicate the selected TAG 139 for the selected TAC 141 for the uplink transmission scheduled by the RAR message. The first TAC 135 is applied to the first TAG 115 that is associated with a Physical Random Access Channel (PRACH) transmission, and the second TAC 137 is applied to the second TAG 117 that is not associated with the PRACH transmission. The first TAC 135 and the second TAC 137 can have different lengths resulting from differential encoding being applied to the first TAC 135 and the second TAC 137. The RAR message can be a message B of a 2 step RACH process (process 180 shown in FIG. 1C) or a message 2 of a 4-step RACH process (process 170 shown in FIG. 1B).

In some embodiments, an indication of the first TAC 135 and the second TAC 137 can be received from base station 103 in a medium access control-control elements (MAC-CE) 128 transmitted to UE 101 when UE 101 is in a connection mode to base station 103. The first TAC 135 or the second TAC 137 can be an absolute TAC carrying an absolute TA adjustment value or a relative TAC carrying a relative TA adjustment value. The MAC-CE further can include a TAG identifier corresponding to the first TAC or the second TAC.

FIG. 2 illustrates a block diagram of UE 101, having antenna panel 217 including one or more antenna elements, e.g., an antenna element 219 coupled to transceiver 203 and controlled by processor 114. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. Transceiver 203, via antenna panel 217, enables wireless communication for UE 101 with base station 103, base station 105, and base station 107. In addition, processor 114 can be communicatively coupled to memory 112, which is further coupled to transceiver 203.

In some examples, RF circuitry 216 is used by UE 101 to perform measurements of reference signals, and to transmit and receive data in the serving cell. Memory 112 can store configuration 113, the first TAG 115, the second TAG 117, the first TA adjustment value 131, the second TA adjustment value 133, the first TAC 135, the second TAC 137, the selected TAG 139, the selected TAC 141. Memory 112 can include instructions, that when executed by processor 114 perform the functions described herein, including functions supporting two TAs in a serving cell communicating with two different TRPs described herein. Alternatively, processor 114 can be "hard-coded" to perform the functions described herein, including functions supporting two TAs in a serving cell communicating with two different TRPs described herein.

Figure 3:
FIG. 3 illustrates an example process performed by a UE to support two timing advances in a serving cell for the UE communicating with two TRPs, according to some aspects of the disclosure.
Figure 3:
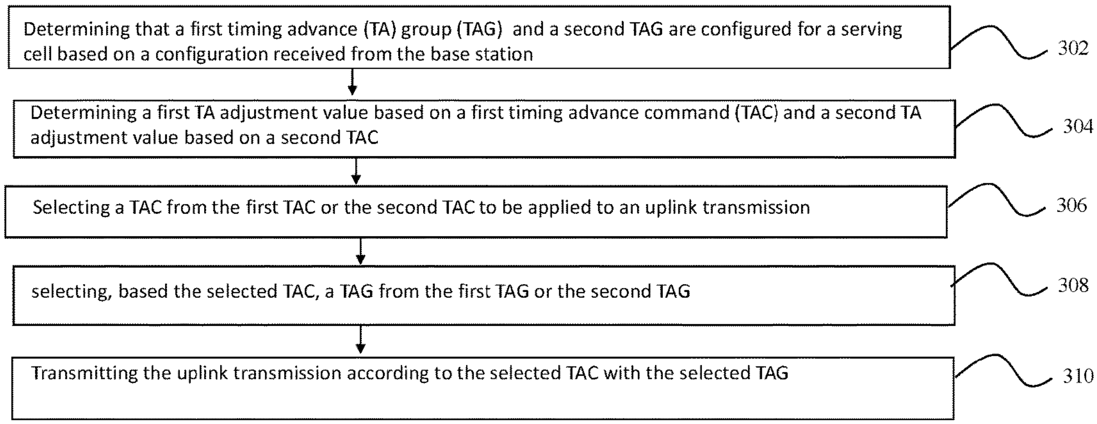

FIG. 3 illustrates an example process 300 performed by a UE to support two timing advances in a serving cell for a UE communicating with two TRPs, according to some aspects of the disclosure. Process 300 can be performed by UE 101 as shown in FIGS. 1-2.

At 302, UE 101 can determine that the first TAG 115 and the second TAG 117 are configured for a serving cell based on configuration 113 received from base station 103. Configuration 113 may be transmitted by RAR message 124 or MAC-CE 128.

In some current systems, a single TAG is configured for each serving cell. In some embodiments, to support two TAs or TAGs for a serving cell, additional TAG-identifier (Id) can be configured in the configuration parameter ServingCellConfig:

```
ServingCellConfig ::= SEQUENCE {
tdd-UL-DL-ConfigurationDedicated TDD-UL-DL-ConfigDedicated OPTIONAL, -- Cond
TDD initialDownlinkBWP BWP-DownlinkDedicated OPTIONAL, -- Need M
...
crossCarrierSchedulingConfig CrossCarrierSchedulingConfig OPTIONAL, -- Need M
tag-Id
TAG-Id,
tag-Id2-r18 TAG-Id  OPTIONAL,
...
}
```

In some embodiments, when two TAGs are configured in the same parameter ServingCellConfig, the parameter TimeAlignmentTimer in both TAGs can be expected to be the same. In some other embodiments, the parameter TimeAlignmentTimer in two TAGs can be different.

In some embodiments, when two TAGs are configured in the same ServingCellConfig, for intra-band carrier aggregation (CA), such as when two serving cells are located in the same band, UE 101 can expect the same TAG to be configured in both ServingCellConfig for both the first TAG and the second TAG. In some embodiments, UE 101 can report whether UE 101 supports different TAG to be configured in both ServingCellConfig for the first TAG and the second TAG.

In some embodiments, when two TAGs are configured in the same ServingCellConfig, for each Cell Group (CG), the maximum number of TAGs can be increased from 4, for example, to 6 or 8. UE 101 can further report the supported maximum number of TAGs to base station 103. The maximum number of TAGs can be reported per CG. Additionally and alternatively, the maximum number of TAGs can be reported across both CGs.

At 304, UE 101 can determine the first TA adjustment value 131 based on the first TAC 135 and the second TA adjustment value 133 based on the second TAC 137.

| TAC (Timing Advance Command) 1 | | | | | |
|---|---|---|---|---|---|
| TAC 1 | TAC 2 | | | | |
| TAC 2 | | | | | |
| UL Grant | | | | | |
| UL Grant | | | | | |
| UL Grant | | | | | |
| UL Grant | R | R | R | R | R |
| Temporary C-RNTI | | | | | |
| Temporary C-RNTI | | | | | |

In some embodiments, when two TAGs are configured in the same parameter ServingCellConfig, for RAR, enhanced MAC RAR can be considered to support two TACs, TAC 1 and TAC 2, as shown in the example above.

As shown above, TAC 1 is the TAC for the first TAG occupying 12 bits, and TAC 2 is the TAC for the second TAG occupying 12 bits. The UL grant for the Uplink Grant field can have 27 bits, and the field R is a Reserved bit, set to 0. The Temporary C-RNTI is the Temporary C-RNTI field occupying 16 bits and indicating the temporary identity that is used by the MAC entity during Random Access. The above structure applies to RAR for the 4 step RACH MSG1 and/or fallback RAR for 2 step RACH MSG B, as shown in FIGS. 1B-1C.

At 306, UE 101 can select a TAC, e.g., determine the selected TAC 141, from the first TAC 135 or the second TAC 137 to be applied to uplink transmission 122.

In some embodiments, when two TACs are configured in the same RAR message, in order to determine which TAC is used for the UL grant, such as scheduled msg3 transmission, the selected TAC 141 can be hardcoded in the specification, for example, the first TAC is used. Additionally and alternatively, base station 103 can first indicate in the RAR message whether the first or the second TAC can be used for msg3 transmission scheduled by the RAR message.

At 308, UE 101 can select, based the selected TAC 141, the selected TAG 139 from the first TAG 115 or the second TAG 117.

In some embodiments, when two TACs are configured in the same RAR message, in terms of mapping a TAC to a TAG, various options can be implemented. In some embodiments, it can be hardcoded in the specification that the first TAC 135 applies to the first TAG 115, and the second TAC 137 applies to the second TAG 117. In some other embodiments, a PRACH transmission can be associated with a TAG. The first TAC 135 applies to the TAG that is associated with the PRACH transmission, and the second TAC 137 applies to the TAG that is not associated with the PRACH transmission.

In some embodiments, when two TACs are configured in the same RAR message, differential encoding can be considered to reduce the number of bits needed for two TACs. In some embodiments, the first TAC 135 can still be encoded at 12 bits, and the second TAC 137 can be encoded at less than 12 bits with the difference to the first TAC.

Similarly, for success RAR for 2 step RACH MSG B as shown in FIG. 1C, two TACs can be configured. Compared to the existing success RAR message, the following fields are added:

Timing Advance Command 2: Timing advanced command for the second TAG, 12 bits;

TAG ID 1: The identification of the TAG that TAC 1 shall be applied to UL;

TAG ID 2: The identification of the TAG that TAC 2 shall be applied to UL.

In some embodiments, the mapping of TAC to PUCCH transmission, the mapping of TAC to TAG, and the encoding of two TACs to TAGs can follow similar approaches as described above.

| UE Contention Resolution Identity | | | |
|---|---|---|---|
| UE Contention Resolution Identity | | | |
| UE Contention Resolution Identity | | | |
| UE Contention Resolution Identity | | | |
| UE Contention Resolution Identity | | | |
| UE Contention Resolution Identity | | | |
| R | Channel Access-Cpext | TPC | HARQ Feedback Timing Indicator |
| PUCCH Resource Timing Indicator | | Advance Command 1 | |
| Timing Advance Command 1 | | | |
| Timing Advance Command 2 | | | |
| Timing Advance Command 2 | TAG ID 1 | TAG ID 2 | |
| C-RNTI | | | |
| C-RNTI | | | |

In some embodiments, enhanced MAC-CE can be considered to allow applying different absolute TACs. As shown below, a MAC-CE indicates the absolute TAC and

| TAG ID | Timing Advance Command |
|---|---|
| Timing Advance Command | |

the TAG ID that the TAC shall be applied to. The TAG ID filed indicates an identification of the TAG that indicated TAC applies to, for legacy, it is 2 bits, but for Rel-18, it can have more bits. In addition, the Timing Advance Command field can indicate an absolute timing advance having 12 bits.

In some embodiments, a MAC-CE can indicate two absolute TACs. As shown below, the first TAC applies to the first TAG, and the second TAC applies to the second TAG. In some embodiments, different encoding can also be considered to reduce the bit width especially for the second TAC.

| TAC (Timing Advance Command) 1 | |
|---|---|
| TAC 1 | TAC 2 |
| TAC2 | |

In some embodiments, for legacy absolute TAC MAC-CE in which only a single 12 bits TAC is configured. The first TAC applies to the TAG that is associated with the PRACH transmission. In PRACH configuration or in the PDCCH order that triggers the PRACH transmission, the associated TAG can be configured.

In some embodiments, a single MAC-CE can be used to change the TA of more than one TAG. This can be an enhancement for relative TAC and/or absolute TAC. For example, as shown below, the TAG ID filed can include an Identification of the TAG that indicated TAC applies to. The Timing Advance Command filed can include a relative timing advance in 6 bits. In some embodiments, differential encoding can be used to reduce TAC bit width.

| TAG ID | Timing Advance Command |
|---|---|
| TAG ID | Timing Advance Command |
| | . . . |
| TAG ID | Timing Advance Command |

At 310, UE 101 can transmit the uplink transmission according to the selected TAC with the selected TAG. In some embodiments, UE 101 can transmit the uplink transmission 122 according to the selected TAC 141 with the selected TAG 139.

Figure 4:
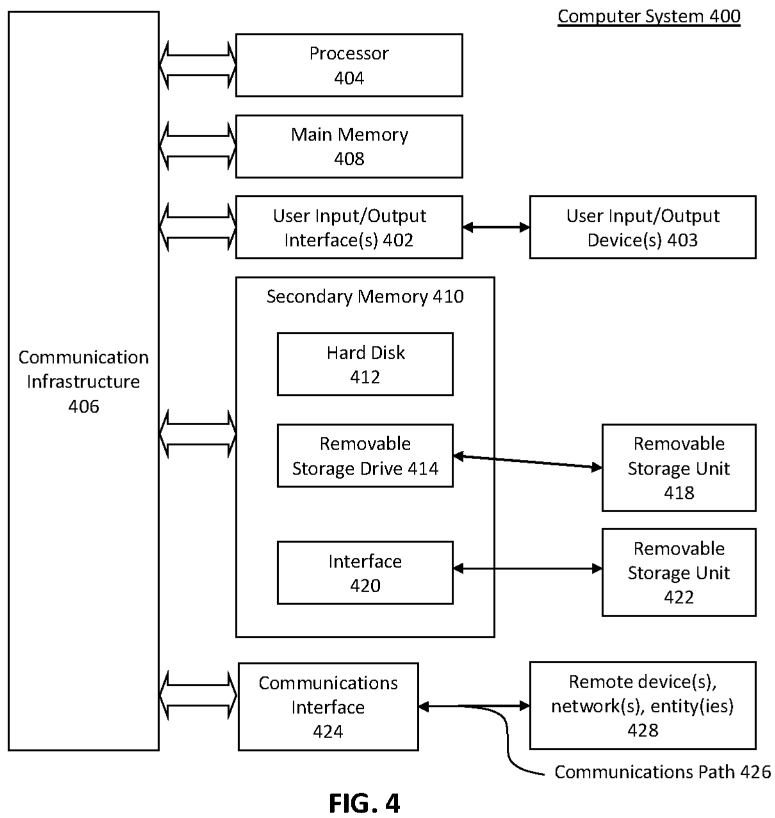
FIG. 4 is an example computer system for implementing some aspects or portion(s) thereof of the disclosure provided herein.

Various aspects can be implemented, for example, using one or more computer systems, such as computer system 400 shown in FIG. 4. Computer system 400 can be any computer capable of performing the functions described herein such as UE 101, base station 103, base station 105, base station 107, as shown in FIG. 1 and FIG. 2, for operations described for UE 101 or process 300 as shown in FIG. 3. Computer system 400 includes one or more processors (also called central processing units, or CPUs), such as a processor 404. Processor 404 is connected to a communication infrastructure 406 (e.g., a bus). Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some aspects, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 408, the removable storage unit 418, the removable storage unit 422 can store instructions that, when executed by processor 404, cause processor 404 to perform operations for a UE or a base station, e.g., UE 101, base station 103, base station 105, base station 107, as shown in FIG. 1 and FIG. 2, for operations described for UE 101 or process 300 as shown in FIG. 3.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426. Operations of the communication interface 424 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 4. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising: a transceiver configured to enable wireless communication with a base station in a wireless system; and a processor communicatively coupled to the transceiver and configured to:

determine that a first timing advance (TA) group (TAG) and a second TAG are configured for a serving cell based on a configuration received from the base station;

determine a first TA adjustment value based on a first timing advance command (TAC) and a second TA adjustment value based on a second TAC, wherein the first TAC and the second TAC are received from the base station in a same random access response (RAR) message during a Random Access Channel (RACH) procedure by the UE, the first TAC and the second TAC were determined based on a time of arrival of a random access preamble received from the UE by the base station;

select a TAC from the first TAC or the second TAC to be applied to an uplink transmission;

select, based on the selected TAC, a TAG from the first TAG or the second TAG; and transmit the uplink transmission according to the selected TAC with the selected TAG.

2. The UE of claim 1, wherein a first time alignment timer for the first TAG is different from a second time alignment timer for the second TAG.

3. The UE of claim 1, wherein the selected TAC is the first TAC when the UE communicates with a first transmission reception point (TRP) of the wireless system, and the selected TAC is the second TAC when the UE communicates with a second TRP of the wireless system.

4. The UE of claim 1, wherein the RAR message includes an indication to indicate the selected TAG for the selected TAC for the uplink transmission scheduled by the RAR message.

5. The UE of claim 1, wherein the first TAC is applied to the first TAG that is associated with a Physical Random Access Channel (PRACH) transmission, and the second TAC is applied to the second TAG that is not associated with the PRACH transmission.

6. The UE of claim 1, wherein the first TAC and the second TAC have different lengths resulting from differential encoding being applied to the first TAC and the second TAC.

7. The UE of claim 1, wherein the RAR message is a message B of a 2 step Random Access Channel (RACH) process or a message 2 of a 4-step RACH process.

8. The UE of claim 1, wherein an indication of the first TAC and the second TAC are received from the base station in a medium access control-control elements (MAC-CE) transmitted to the UE when the UE is in a connection mode to the base station.

9. The UE of claim 8, wherein the first TAC or the second TAC is an absolute TAC carrying an absolute TA adjustment value or a relative TAC carrying a relative TA adjustment value.

10. The UE of claim 8, wherein the MAC-CE further includes a TAG identifier corresponding to the first TAC or the second TAC.

11. A method for a user equipment (UE), comprising:

determining that a first timing advance (TA) group (TAG) and a second TAG are configured for a serving cell based on a configuration received from a base station;

determining a first TA adjustment value based on a first timing advance command (TAC) and a second TA adjustment value based on a second TAC, wherein the first TAC and the second TAC are received from the base station in a same random access response (RAR) message during a Random Access Channel (RACH) procedure by the UE, the first TAC and the second TAC were determined based on a time of arrival of a random access preamble received from the UE by the base station;

selecting a TAC from the first TAC or the second TAC to be applied to an uplink transmission;

selecting, based on the selected TAC, a TAG from the first TAG or the second TAG; and transmitting the uplink transmission according to the selected TAC with the selected TAG.

12. The method of claim 11, wherein a first time alignment timer for the first TAG is different from a second time alignment timer for the second TAG.

13. The method of claim 11, wherein the selected TAC is the first TAC when the UE communicates with a first transmission reception point (TRP) of the wireless system, and the selected TAC is the second TAC when the UE communicates with a second TRP of the wireless system.

14. The method of claim 11, wherein the RAR message includes an indication to indicate the selected TAG for the selected TAC for the uplink transmission scheduled by the RAR message.

15. The method of claim 11, wherein the first TAC is applied to the first TAG that is associated with a Physical Random Access Channel (PRACH) transmission, and the second TAC is applied to the second TAG that is not associated with the PRACH transmission.

16. The method of claim 11, wherein the RAR message is a message B of a 2 step Random Access Channel (RACH) process or a message 2 of a 4-step RACH process.

17. A non-transitory computer-readable medium storing instructions that, when executed by a processor of a user equipment (UE), cause the UE to perform operations, the operations comprising:

determining that a first timing advance (TA) group (TAG) and a second TAG are configured for a serving cell based on a configuration received from [a base station;

determining a first TA adjustment value based on a first timing advance command (TAC) and a second TA adjustment value based on a second TAC, wherein the first TAC and the second TAC are received from the base station in a same random access response (RAR) message during a Random Access Channel (RACH) procedure by the UE, the first TAC and the second TAC were determined based on a time of arrival of a random access preamble received from the UE by the base station;

selecting a TAC from the first TAC or the second TAC to be applied to an uplink transmission;

selecting, based on the selected TAC, a TAG from the first TAG or the second TAG; and transmitting the uplink transmission according to the selected TAC with the selected TAG.

* * * * *